United States Patent [19]
Parker et al.

[11] Patent Number: 5,823,636
[45] Date of Patent: Oct. 20, 1998

[54] VEHICLE BRAKING SYSTEM

[75] Inventors: Donald Lee Parker, Middletown; Donald Edward Schenk, Vandalia; Schuyler Scott Shaw, Dayton, all of Ohio

[73] Assignee: General Motors Corporation, Detroit, Mich.

[21] Appl. No.: 806,003

[22] Filed: Feb. 24, 1997

[51] Int. Cl.[6] .................................................. B60T 13/74
[52] U.S. Cl. .......................... 303/3; 303/15; 303/113.4; 188/126; 188/106 F; 188/106 P
[58] Field of Search .................................. 188/326, 156, 188/157, 106 F, 106 P, 363, 182; 303/3, 15, 20, 155, 113.4

[56] References Cited

U.S. PATENT DOCUMENTS

| | | | |
|---|---|---|---|
| 4,416,356 | 11/1983 | Osborne | 188/326 |
| 4,732,240 | 3/1988 | Flaim | 188/78 |
| 5,000,297 | 3/1991 | Shaw et al. | 188/156 |
| 5,024,299 | 6/1991 | Shaw et al. | 188/156 |
| 5,159,998 | 11/1992 | Copp et al. | 188/340 |
| 5,219,049 | 6/1993 | Unterborn | 188/156 |
| 5,261,730 | 11/1993 | Steiner et al. | 303/113.4 |
| 5,310,026 | 5/1994 | Shaw et al. | 188/156 |
| 5,333,944 | 8/1994 | Shirai et al. | 303/113.4 X |

*Primary Examiner*—Lee W. Young
*Attorney, Agent, or Firm*—Jeffrey A. Sedlar

[57] ABSTRACT

A vehicle braking system that primarily operates as a pure brake-by-wire system, with optional hydraulic actuation. The system includes a set of four electrically actuated drum brakes. At least two of the wheel brakes include hydraulic actuators that operate to apply the wheel brakes independent of electric control. Each of the wheel brakes is normally operated in response to a control signal generated by the vehicle's brake processor. As such, a primary brake-by-wire system is provided at all four vehicle wheels. The rear brakes are proportioned to the front brakes electrically, according to design criteria.

10 Claims, 3 Drawing Sheets

VEHICLE BRAKING SYSTEM

TECHNICAL FIELD

The present invention relates to a vehicle braking system and more particularly, to a vehicle braking system that is operable in a four wheel, full time brake-by-wire mode

BACKGROUND OF THE INVENTION

Typical vehicle braking systems generally include an arrangement of front disc brakes with rear drum brakes, or a system with four-wheel disc brakes. These conventional vehicle braking systems are characterized by typical hydraulic actuators at the wheel brakes that effect brake apply action in response to an increasing hydraulic fluid pressure. The fluid pressure is usually generated by a power boosted manual input on the vehicle's brake pedal. Other systems use a remote pump assembly that responds to brake pedal application to generate, store, and operate as the hydraulic pressure source for braking activity. These basic systems have presently been adapted to operate with assistance from electronic controls, to perform advanced braking and vehicle handling functions. The art has also seen the advent of so called brake-by-wire systems that utilize this technology to effect braking operations through electronic control without brake pedal application. A common similarity of many such systems is that they rely on conventional hydraulic power to actuate the wheel brakes and therefore, are not "pure" brake-by-wire systems.

The art has recognized that since braking systems are often operated through the assistance of electronic controls, they have become particularly well suited for utilizing electrically actuated wheel brakes. Examples of such electrically actuated brakes are described in commonly assigned U.S. Pat. Nos. 5,000,297 issued Mar. 19, 1991; 5,024,299 issued Jun. 18, 1991; 5,219,049 issued Jun. 15, 1993; and, 5,310,026 issued May 10, 1994. These references disclose various electric drum brakes that use motor driven power screws for actuating the wheel brakes.

SUMMARY OF THE INVENTION

In light of the prior art, the problem confronted is: how to achieve a pure brake-by-wire vehicle braking system, that is capable of being actuated hydraulically when preferred. Complicating factors in finding a solution include maintaining the designed in braking effect, generated when the linings of a leading-trailing shoe drum brake contact the drum. More specifically, a leading shoe is designed with consideration given to the effect of apply augmentation resulting from the rotation of the drum and the force vector generated thereby, during a brake apply wherein the leading shoe is said to "wrap-in." Likewise, a trailing shoe is designed with consideration given to the effect of apply resistance resulting from the rotation of the drum and the force vector generated thereby, wherein the trailing shoe is said to "wrap-out." Therefore, to effectively provide an electrically actuated drum brake for primary brake-by-wire and secondary hydraulic operation, the leading trailing shoe orientation is preferably maintained.

Complicating factors are also encountered when a duo-servo type brake application scheme is desirably maintained. Specifically, with a duo-servo drum brake, the typically used shoe pair is "self-energized." An actuator applies force to the shoes which is supplemented by the tendency of the shoes to wrap into the drum during brake applies. This amplifies the actuating force in both forward and reverse directions of rotation. To enable the generation of the self-energized force, the shoes have to be able to transfer force between themselves. Therefore, the shoes have to be carried in a manner that permits a force transfer.

Accordingly, it is a goal of the present invention to provide a vehicle braking system that primarily operates as a true brake-by-wire system, with optional hydraulic actuation. In fulfillment of this goal, a vehicle braking system having a set of four electrically actuated drum brakes is provided. Each of the wheel brakes is operated in response to an independent control signal generated by the vehicle's brake processor hereinafter called an electronic control unit or "ECU." As such, a primary brake-by-wire system is provided at all four vehicle wheels. The rear brakes are proportioned to the front brakes electrically, according to design criteria. Anti-lock braking (ABS), is established with inputs from conventional wheel speed sensors, and the ECU activates selected electric drum brake releases at any particular wheel independently. Traction control and vehicle handling augmentation is achieved through selected brake application at any wheel(s) when desirable.

As described in greater detail herein, a preferred embodiment of the present invention includes a conventional unboosted, dual-piston, hydraulic master cylinder. A brake pedal actuator is positioned for receiving manual inputs from the vehicle's driver and is interconnected with the master cylinder through a push-rod. A force-to-current transducer is associated with the push-rod for generating a brake application rate proportional signal. Twin hydraulic braking circuits are connected to the master cylinder and each communicates with a three-way solenoid operated valve.

The preferred system includes a wheel brake having a backing plate, at least one brake shoe pivotally mounted to the backing plate, an electric motor driven power screw actuator mounted to the backing plate, an apply lever pivotally engaging the actuator, and a hydraulic actuator engaging the brake shoe(s). The braking circuits extend between the master cylinder and the hydraulic actuator of the wheel brakes. The three-way valve is electrically actuated and has three ports: a first port communicating with the hydraulic port of the master cylinder, a second port communicating with the hydraulic port of the wheel brake and a third port connected to a pedal feel emulating device. The first port is normally open to the second port through the valve. An ECU monitors the transducer and operates to effect movement of the valves to open fluid communication between the master cylinder and the wheel brakes, and operates to effect energization of the electric motor driven power screw actuator to apply the wheel brake. When an electrical signal to the valve is absent, actuation of the wheel brake is effected through hydraulic pressurization in the master cylinder, with pressure communicated to the hydraulic actuator of the wheel brake through the braking circuits and the valves. Advantageously, the present invention enables full time brake by wire operation at all four vehicle wheels. At least two of the wheel brakes are hydraulically actuated when required or preferred.

DESCRIPTION OF THE PREFERRED EMBODIMENT

Figure 1:
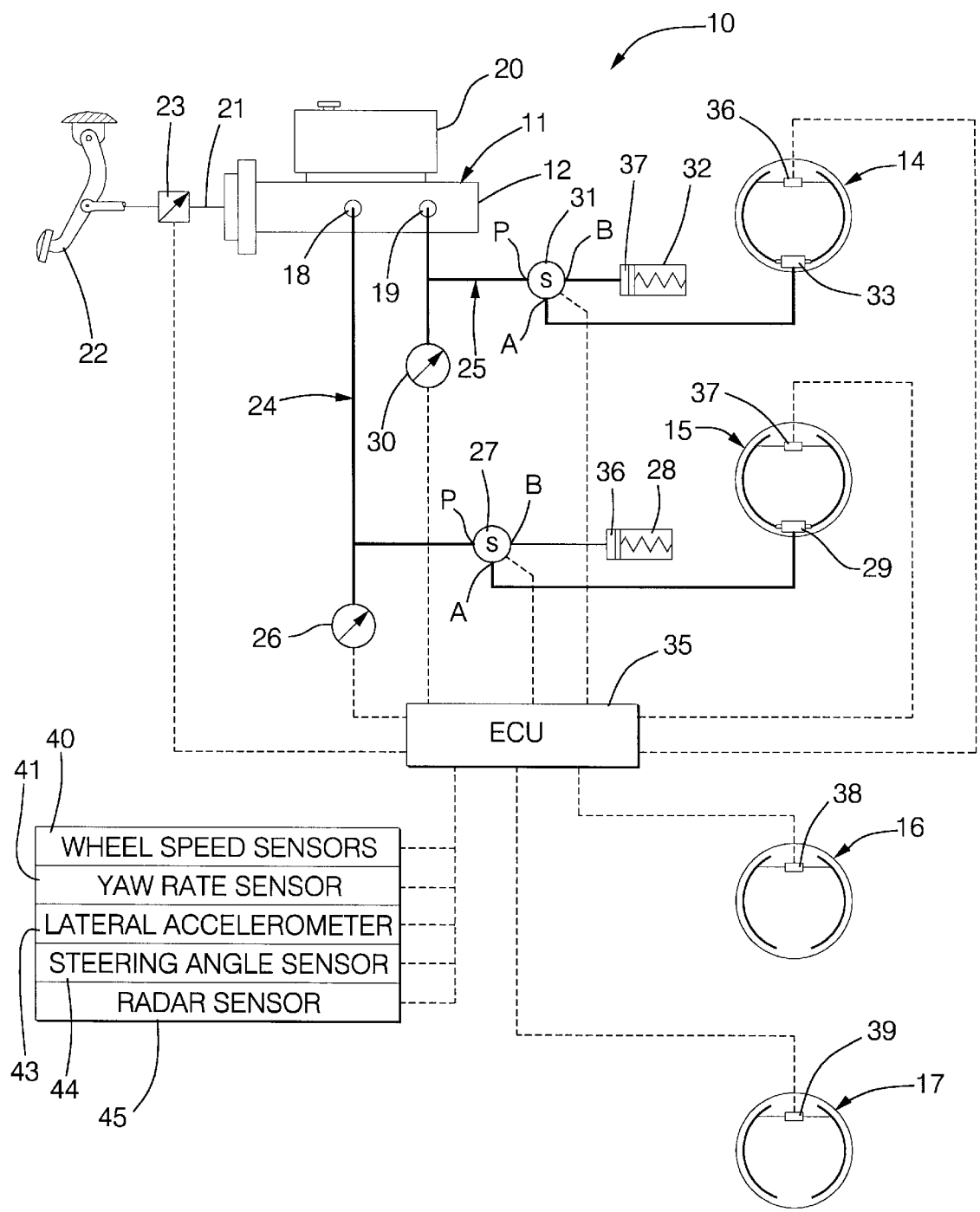
FIG. 1 is a diagrammatic illustration of a vehicle braking system according to the present invention.

Referring to the drawings, illustrated in FIG. 1 is a vehicle braking system designated in the aggregate as 10. Braking system 10 in general, is configured to operate primarily as a brake-by-wire system during all power braking operations. The wheel brakes 14–17 are electrically actuated to brake the vehicle to a stop during routine braking events and during all anti-lock braking, traction control and vehicle stability enhancement braking operation. In general, at least two of the wheel brakes 14–17 include a secondary, hydraulic actuation mechanism that operates when preferred or necessary. Hydraulic actuation is in an unboosted form and remains fully operational in the event that power braking is absent.

In the braking system 10, all four wheel brakes 14–17 are configured as linear output, leading-trailing drum brakes. With this type of brake, a complex relationship between the anchor pin location, actuator location, and actuating force, along with shoe, lining and drum stiffness and deflection, results in the preferred contact pressure distribution between brake lining and drum surfaces. Accordingly, the present combination electric and hydraulic actuation scheme is designed to minimize contact pressure variations and to maintain the designated leading-trailing shoe configuration during each form of brake actuation.

The braking system 10 includes a dual piston hydraulic master cylinder assembly 11 as is conventionally known in the art. The master cylinder assembly 11 includes a cylinder body 12 with separately pressurizable ports 18,19 and a reservoir 20 for carrying a supply of hydraulic fluid. During operation of the master cylinder assembly 11, movement of dual internal pistons (not illustrated), under the application of a force, closes the ports 18 and 19 off from the reservoir 20 and provides a dual fluid pressurization result, at the ports 18,19. When the applied force is released, the internal pistons move under the operation of return springs (not illustrated), relieving the fluid pressure and reopening fluid communication between the ports 18,19 and the reservoir 20 for releasing pressure and for returning excess fluid to reservoir 20.

Manually applied force is transferred to the master cylinder assembly 11 through an engaging pushrod 21. The pushrod 21 is connected to a pivotal brake pedal 22 carried in the passenger compartment of the associated vehicle. When the driver applies manual force to the brake pedal 22, the force is transferred through the push rod 21 to the master cylinder assembly 11 resulting in a proportional fluid pressure at ports 18,19. The amount of force exerted on the brake pedal 22 is monitored by an associated force-to-current transducer 23. Accordingly, an electric signal is derived from the transducer 23 that is relative to the magnitude of the force applied to the brake pedal. This signal is therefore, readily utilized to determine the amount of braking action that is called for by the driver.

The brake system 10 includes twin closed loop hydraulic circuits 24,25 with the master cylinder assembly 11 as the pressurization device for both. Make up fluid is delivered as needed, from the reservoir 20 to the circuits 24,25 through the master cylinder body 12. Circuit 24 extends from port 18 of master cylinder assembly 11 and includes a pressure-to-current transducer 26, a three-way valve 27, a pedal feel emulator 28 that provides compliance, and a hydraulic actuator 29. Circuit 25 extends from port 19 of master cylinder assembly 11 and includes a pressure-to-current transducer 30, a three-way valve 31, a pedal feel emulator 32 that provides compliance, and a hydraulic actuator 33. The transducers 26,30 monitor the amount of fluid pressure generated in the circuits 24,25. Accordingly, electric signals are derived from the transducers 26,30 that are relative to the magnitude of the force applied to the brake pedal. These signals provide redundancy to the signal derived from the transducer 23 and therefore, can be used to check system operation and optionally, to determine the amount of braking action that is called for by the driver.

The three-way valves 27,31 each include a port P that receives fluid pressure available at the ports 18,19 of the master cylinder assembly 11. In their normal de-energized state, the valves 27,31 communicate the master cylinder pressure to their ports A. Therefore, the master cylinder generated pressure is available to the wheel brakes 14,15 in a no-power mode. The wheel brakes 14,15 are provided with hydraulic actuators 29,33 in the form of conventional dual opposed piston wheel cylinders. The valves 27,31 also each include a port B. The ports B are connected to artificial pedal feel devices 28,32 or optionally to a single dual pedal feel device (not illustrated). The pedal feel devices 28,32 each include an internal chamber that is expansible and contractible against the bias of a spring type device to selectively provide compliance in the circuits 24,25 when the valves 27,31 are energized. The compliance provided is specifically tuned to provide a close approximation of typical wheel brake actuation for the response at brake pedal 22.

Operation of the hydraulic circuits 24, 25 is bi-state. The state selected is a function whether the valves 27,31 are energized or de-energized. Typically, the valves 27 and 31 are energized whenever actuation of the brake pedal 22 is sensed. This can be determined through the transducer 23 or the transducers 26,30. Optionally, actuation of the brake pedal 22 can be determined through the vehicle's brake light switch (not illustrated). The valves 27 and 31 will also be energized whenever the ECU 35 initiates a traction control, stability enhancement or other automatic braking event in a manner well known in the art.

When the valves 27,31 are energized and force is applied to the brake pedal 22, a fluid pressure is made available at the ports 18,19 by operation of the master cylinder assembly 11. The fluid pressure is transferred through the circuits 24,25 to the valves 27,31 and communicated therethrough from ports P to ports B. Ports A are closed off from the pressurized fluid by the valves 27,31. The pressurized fluid is communicated to the pedal feel devices 28,32 expanding the chambers 36,37 against the compliance of the device. Generally, the compliance will be tuned to provide an initial amount of light bias, approximating a condition wherein brake linings are brought into contact and brake system compliance is taken-up. Subsequently, the amount of bias is tuned to increase, approximating the operation of a hydraulic pressure increase in a braking system. This is tailored to account for the design of the remainder of the circuit 24,25.

When force is applied to the brake pedal 22 and the valves 27,31 remain de-energized, fluid pressure is again made available at the ports 18,19 by operation of the master cylinder assembly 11. The fluid pressure is transferred through the circuits 24,25 to the valves 27,31 and communicated therethrough from ports P to ports A. Ports B are closed off from the pressurized fluid by the valves 27,31. The pressurized fluid is communicated to the hydraulic actuators 29,33 forcing their pistons apart to apply the wheel brakes 14,15. The wheel brakes 14,15 are provided at the front wheels of the associated vehicle. Optionally, the rear wheel brakes 16,17 are also provided with hydraulic actuators to operate in applying the brakes in response to the hydraulic pressure generated by the master cylinder assembly 11.

In addition to hydraulic operation, the braking system 10, is principally operated as a brake-by-wire system through control of the electrical actuators 36–39, which are associated with the wheel brakes 14–17. When force is applied to the brake pedal 22, the valves 27,31 are energized. The amount of force applied to the brake pedal 22 is monitored by the transducer 23 and a signal is delivered to the ECU 35 providing it with the relevant data. The ECU 35 is also provided with information about the level of fluid pressure in the circuits 24,25. Additional information concerning operation of the vehicle is also provided to the ECU 35 from elements such as wheel speed sensors 40, a yaw rate sensor 41, a lateral accelerometer 43, a steering angle sensor 44, and a radar obstruction sensor 45. ECU 35 may be any microprocessor-based controller suitable for providing output commands to the valves 27,31 and the actuators 36–39, and for receiving input signals from the various sources described above. The ECU 35 factors all relevant data and signals each of the electric actuators 36–39 to apply and release the given wheel brakes 14–17 a determined amount. Accordingly, the braking system 10 applies all four wheel brakes 14–17 electrically, in response to the application of force to the brake pedal 22, or in response to an electronically determined condition, independent of brake pedal force.

Figure 2:
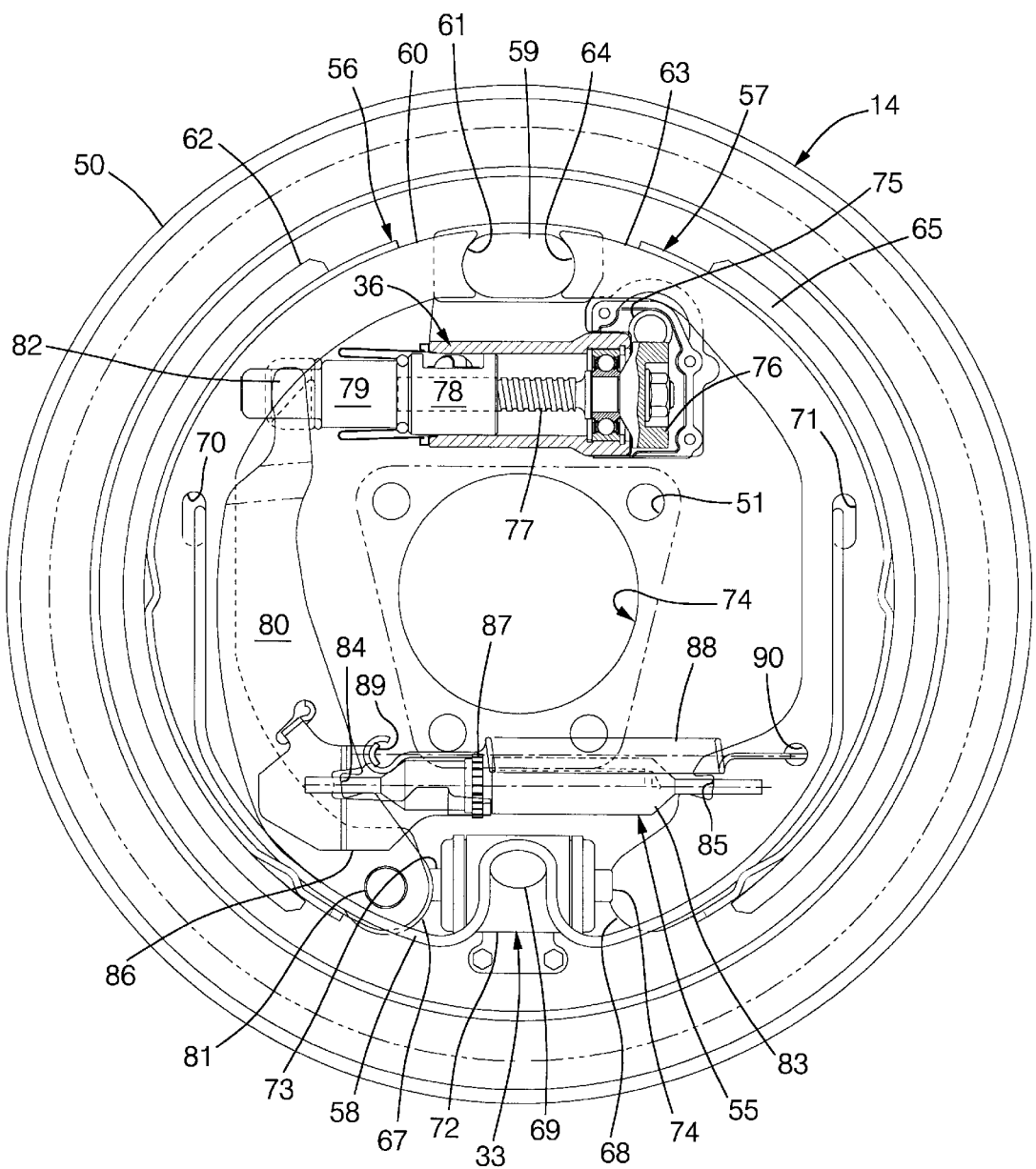
FIG. 2 is a fragmentary cross sectional illustration of a wheel brake used in the vehicle braking system of FIG. 1.

Referring to FIG. 2, the front wheel brake 14 is illustrated in greater detail and is configured according to a leading-trailing operational scheme. FIG. 2 also represents the wheel brake 15, although, the leading-trailing sides will be reversed, and optionally, the rear wheel brakes 16,17 can be configured according to FIG. 2 if preferred. As a further option, the rear wheel brakes 16,17 are provided with electrically actuated parking brakes as detailed in commonly assigned U.S. Pat. No. 5,024,299 which issued Jun. 18, 1991 and is specifically incorporated herein by reference.

The wheel brake 14 includes a backing plate 50 that includes openings 51 for attachment to the steering knuckle or axle of a vehicle. In general, the backing plate 50 carries an electric actuator 36, lever 80, adjuster 55, hydraulic actuator 33, shoes 56 and 57, and unitary retaining spring 58. An oval shaped anchor pin 59 extends from the backing plate 50, with the exact shape being tailored to provide a selected leverage of friction force reaction at the anchor pin 59, according to the application. The brake drum is omitted from the illustration allowing the internal components to be seen.

The shoe 56 includes a shoe rim 60 having an end 61 engaging the anchor pin 59. A brake lining 62 is secured to the shoe rim 60 in a suitable manner well known in the art. Similarly, the shoe 57 includes a shoe rim 63 with end 64 engaging the anchor pin 59, and a brake lining 65. Ends 67,68 of shoes 56,57 respectively, engage the hydraulic actuator 33. The hydraulic actuator 33 is fixed to the backing plate 50 and includes an integral post 69. The spring 58 wraps around the post 69 and is thereby anchored to the backing plate 50. The spring also engages shoe 56 in opening 70 and shoe 57 in opening 71, retaining the shoes 56,57 on the backing plate 50 and biasing them to a brake released position.

The hydraulic actuator 33 includes a cylinder housing 72 having oppositely disposed plungers 73,74 connected to wheel cylinder pistons (not illustrated), inside the housing 72 as is well known in the art. Plunger 73 engages the end 67 of shoe 56 and plunger 74 engages the end 68 of shoe 57. When hydraulic pressure is communicated to the hydraulic actuator 33, the plungers 73,74 are forced apart. This forces the ends 67,68 of the shoes 56,57 apart. Ends 61,64 of shoes 56,57 respectively, pivot on pin 59. The brake linings 62 and 65 are forced toward the drum which is assumed to be rotating in the counter-clockwise direction as viewed in FIG. 2. The hydraulic actuator 33 engages the leading end (end 68), of shoe 57 and the trailing end (end 67), of shoe 56 relative to the rotating drum. Therefore, shoe 57 is the leading shoe and shoe 56 is the trailing shoe.

The electric actuator 36 is carried by backing plate 50 on the opposite side of hub 74 from hydraulic actuator 33. Electric actuator 36 includes a worm gear 75 positioned on the end of a motor armature shaft that is provided with bi-directional rotary motion by an electric motor (not illustrated). Rotational motion of worm gear 75 causes rotational motion of helical gear 76. Helical gear 76 is secured on the end of ball screw 77, which rotates in concert with the helical gear 76. The ball screw is centered in the electric actuator's housing by a bearing and engages ball nut 78. When the ball screw 77 is driven to rotate in a first direction, the ball nut 78 translates linearly within the electric actuator's housing in a direction away from helical gear 76. When the ball screw 77 is driven to rotate in a second, opposite direction, the ball nut 78 translates linearly within the electric actuator's housing in a direction toward helical gear 76. A link 79 is connected to the ball nut 78 and translates linearly therewith. The lever 80 is connected to shoe 56 near the end 67 by pivot joint 81. The end 82 of lever 80 is engaged with the link 79 and therefore, linear motion of the electric actuator 36 translates into pivotal motion of the lever 80.

Lever 80 is also engaged with the adjuster 55. Adjuster 55 includes a strut 83 that extends between notch 84 of lever 80 and notch 85 of shoe 57. Adjuster 55 also includes an actuator 86 that automatically turns the star wheel 87 to extend the strut 83 to compensate for wear of the brake linings 62,65. A strut spring 88 extends between tab 89 of actuator 86 and opening 90 of shoe 57 providing retracting force to help maintain the strut 83 in position.

When rotational motion of the ball screw 77 causes extension of the electric actuator 36 such that the link 79 and end 82 move to the left as viewed in FIG. 2, lever 80 pivots, substantially at the point where it engages the strut 83 in notch 84. This causes the pivot joint 81 and the end 67 of shoe 56, to move inward. In response, brake lining 62 is retracted away from the brake drum releasing the wheel brake 14. Similarly, through the returning action of the retaining spring 58, spring 88 and strut 83, the shoe 57 is retracted away from the brake drum. Rotational motion of the ball screw 77 in the opposite direction causes retraction of the electric actuator 36 such that the link 79 and end 82 move to the right as viewed in FIG. 2. As a result, lever 80 pivots, substantially at the point where it engages strut 83 in notch 84. This causes the pivot joint 81 and the end 67 of shoe 56 to move outward. In response, brake lining 62 is extended outwardly toward the drum to apply the wheel brake 14. Similarly, through the strut 83, shoe 57 is extended outwardly toward the drum so that brake lining 65 engages the drum.

The operation of the electric actuator 36 causes the brake shoe 56 to be forced toward the brake drum near its end 67. Similarly, the brake shoe 57 is forced toward the brake drum near its end 68. Therefore, shoe 57 remains the leading shoe and shoe 56 remains the trailing shoe as is the case during actuation of the wheel brake 14 through operation of the hydraulic actuator 33.

Figure 3:
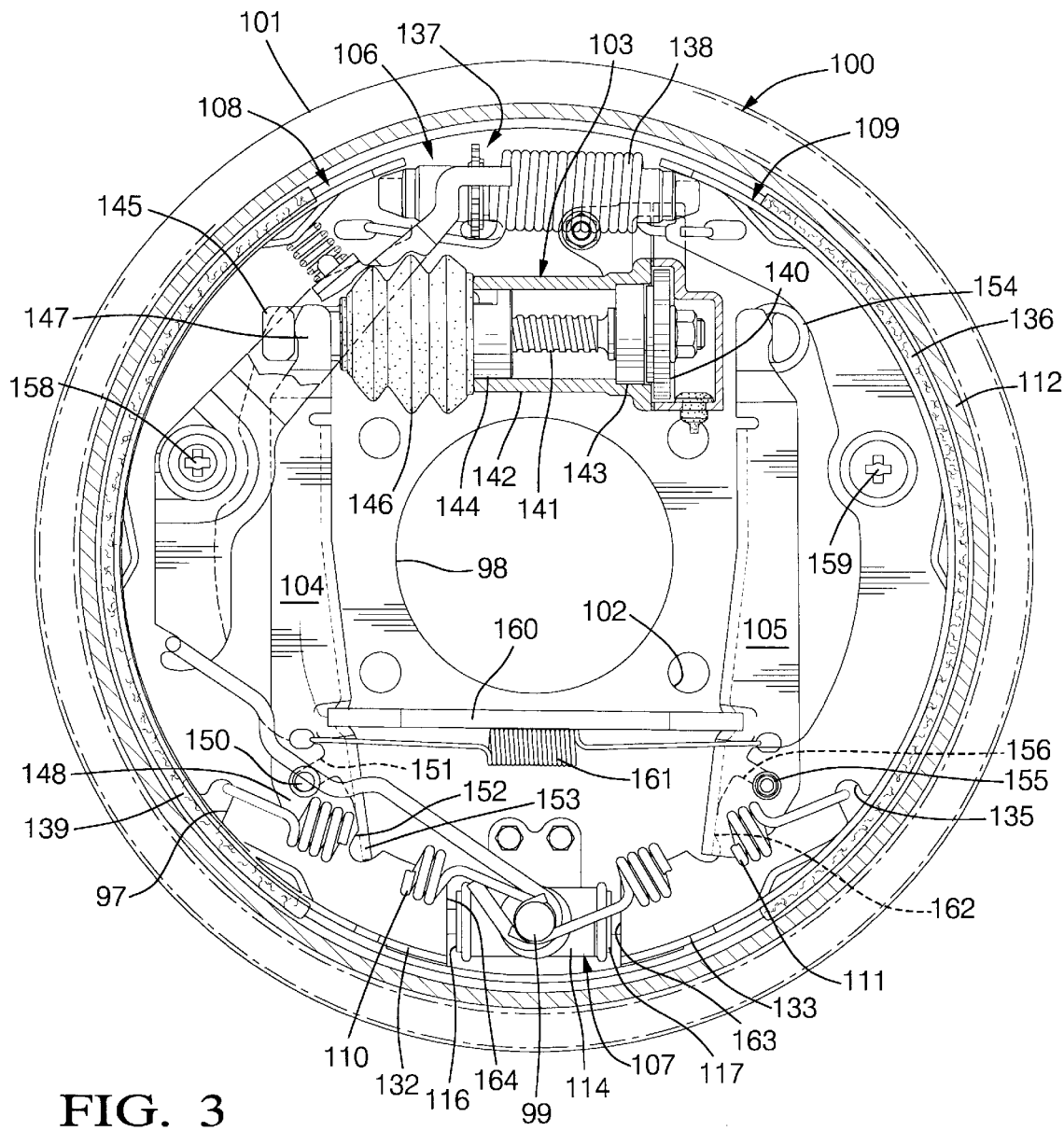
FIG. 3 is a fragmentary cross sectional illustration of a wheel brake according to an alternative embodiment of the present invention and used in the vehicle braking system of FIG. 1.

Referring to FIG. 3, an optional embodiment designated as wheel brake 100 is illustrated, and which is usable as the front wheel brakes in the system of FIG. 1, and as the rear wheel brakes if it is preferable to enable hydraulic actuation thereof. Wheel brake 100 is configured according to a duo-servo operational scheme. A rigid backing plate 101 includes openings 102 for attaching the wheel brake 100 to the steering knuckle or axle of a vehicle about hub 98. In general, the backing plate 101 carries an electrical actuator 103, levers 104,105, adjuster 106, hydraulic actuator 107, shoes 108,109, and return springs, 110,111. The return springs 110,111 engage a post 99 that extends from the body 114 of hydraulic actuator 107 as an anchor to backing plate 101. A brake drum 112 is rotatably supported about the shoes 108,109.

Figure 4:
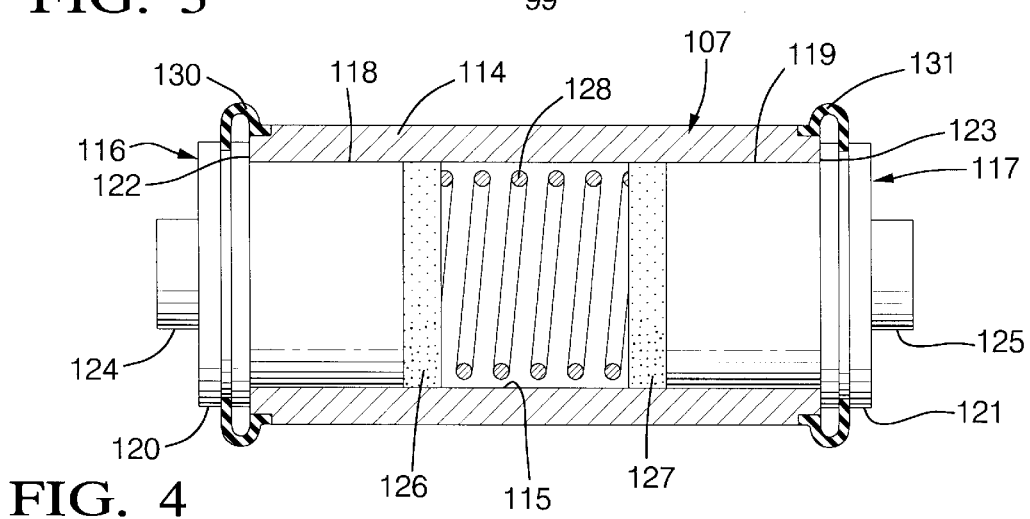
FIG. 4 is a fragmentary cross sectional illustration of a hydraulic wheel cylinder used in the wheel brake of FIG. 3.

Additional reference is directed to FIG. 4 wherein the hydraulic actuator 107 is illustrated in greater detail. Hydraulic actuator 107 includes a cast body 114 that is rigidly secured to the backing plate 101 as seen in FIG. 3. The body 114 includes a piston bore 115 that is connectable to a brake line for receiving hydraulic pressure from the associated brake system such as brake system 10 of FIG. 1. Bore 115 carries a pair of opposed pistons 116,117 that are forced outwardly in response to an increase in hydraulic pressure in the bore 115. The pistons 116,117 include segments 118, 119 respectively, that are sized to provide a close sliding fit within the bore 115, and a larger diameter segment 120,121 respectively. The segments 120,121 provide positive stops against the ends 122,123 respectively, of the body 114. Providing positive stops for the inwardly directed travel of pistons 116,117 is significant in the operation of the wheel brake 100 during electric actuation wherein forces can be transferred from the shoes 108,109 to the pistons 116,117. Pistons 116,117 also include heads 124,125 respectively, for engagement with the shoes 108,109.

A pair of seals 126,127 are biased against the pistons 116,117 respectively, by a spring 128 providing fluid tight engagement with the body 114 within the bore 115. When fluid pressure forces the pistons 116,117 outwardly form the bore 115, the spring 128 urges the seals 126,127 to follow, preventing the escape of any pressure past the pistons. A pair of resilient boots 130,131 are secured between grooves provided in their respective pistons and ends of the body 114, to protect the internal surfaces of the hydraulic actuator 107.

Referring again to FIG. 3, assuming the forward direction of rotation is counter-clockwise, the brake shoe 109 is the primary brake shoe when the wheel brake 100 is applied by actuating either the electric actuator 103 or the hydraulic actuator 107, when the associated vehicle is traveling in the forward direction. The primary brake shoe 109 has a shoe rim 133 which, in the rest position is spring biased towards the piston 117 by a return spring 111 which hooks into a slot 135. A brake lining 136 is secured to the rim 133 of primary shoe 109, for engagement with the drum 112 during brake application. A secondary brake shoe 108 is joined with the primary brake shoe 109 by an adjuster strut and star wheel combination 137 which form part of the adjuster mechanism 106. The upper ends of the brake shoes 109,108 adjacent the adjuster strut 137 are biased together by a spring 138. Brake shoe 108 includes a lining 139 secured thereto. Additionally, the brake shoe 108 is urged towards the piston 116 by a return spring 110 which hooks into a slot 97.

For electric actuation, a motor (not illustrated), is provided in the electric actuator 103 for turning the drive screw gear 140. The housing 142 is fixably connected by suitable fasteners or connective means with the backing plate 101, and is protected at one end by a dust boot 146. The drive screw gear 140 is torsionally connected with a drive screw 141. The drive screw 141 is mounted within a housing 142 by a bearing 143. A ball nut 144 is threadably engaged with the drive screw 141. The ball nut 144 is slidably mounted within the housing 142. The end 145 of the ball nut 144 is formed for engagement with the end 147 of the lever 104.

Near end 148, the lever 104 has a projecting pin 150 which fits within a slot 151 of the brake shoe 108 and is engaged with the backing plate 101. The principle pivotal contact between the lever 104 and the brake shoe 108 is accomplished near point 152 where arm 153 of lever 104 makes contact with the shoe rim 132. Referring to the area of lever 105, a stud 154 is fixed to the backing plate 101. The stud 154 provides a point of pivotal attachment or contact of the lever 105 with the backing plate 101. Similar to lever 104, lever 105 has a projecting pin 155 mounted within a slot 156 in shoe rim 133 of the brake shoe 109. Hold down pins 158,159, in a manner well known in the art, keep the brake shoes 108 and 109 attached with the backing plate 101 with a limited degree of movement. A strut member 160 is held in pivotable engagement between the levers 104,105 by a spring 161.

To actuate the wheel brake 100, the drive screw 141 is motor driven, causing the ball nut 144 to be pulled towards the bearing 143. Movement of the ball nut 144 and the end 145 thereof, causes a force impartation to the end 147 of lever 104. Force is transferred to point 152 of shoe rim 132, which pushes brake shoe 108 outwardly into the brake drum 112. Simultaneously, via the strut 160, the lever 104 imparts a force on the lever 105 engaging the shoe rim 133 at point 162 causing the brake shoe 109 to pivot outwardly, engaging the brake drum 112. This causes end 163 of the shoe to separate from the piston 117. Movement of the brake shoe 109 will push the adjuster strut 137 leftward and transmit force to the brake shoe 108, which is grounded by the piston 116, thereby providing a duo-servo action. Piston 117, although biased outwardly by the spring 128, remains stationary even when the end 163 of brake shoe 109 separates therefrom. The bias imparted by spring 128 doesn't overcome the hydraulic lock provided by the closed circuit effected (e.g.), by shifting of the valves 27,31 in the brake circuit of FIG. 1. When the drum 112 is rotating in a clockwise direction during reverse operation of the associated vehicle, the wrap-in force is generated in brake shoe 108 and transferred to the brake shoe 109 through the adjuster strut 137.

During hydraulic actuation of wheel brake 100, fluid pressure is communicated to the bore 115, and the pistons 116,117 are forced apart. This forces the ends 163 and 164 of brake shoes 109,108 respectively, apart. The linings 136,139 are forced toward the drum 112 which is rotating in the counter-clockwise direction. The hydraulic actuator engages the end 163 of brake shoe 109 and the end 164 of brake shoe 108. The self-energizing force developed by wrap-in of brake shoe 109 due to the rotation of drum 112 is transferred to the brake shoe 108 through the adjuster strut 137 maintaining the duo-servo operation of the wheel brake 100. When the drum 112 is rotating in a clockwise direction during the reverse operation of the associated vehicle, the wrap-in force is generated in brake shoe 108 and transferred to the brake shoe 109 through the adjuster strut 137.

Accordingly, a pure brake-by-wire vehicle braking system is provided, that is capable of being actuated hydraulically when preferred. The designed in braking effect, generated when the linings of a leading-trailing shoe drum brake contact the drum is maintained during both electric and hydraulic actuation. Additionally, a duo-servo type brake application scheme is optionally maintained during both electric and hydraulic actuation.

We claim:

1. A vehicle braking system comprising:

a wheel brake having a backing plate, at least one brake shoe movably mounted to the backing plate, an electric driven power screw actuator mounted to the backing plate, an apply lever pivotally engaging the actuator, and a hydraulic actuator engaging the brake shoe;

a master cylinder with a hydraulic port;

a brake line extending between the hydraulic port of the master cylinder and the hydraulic actuator of the wheel brake;

a brake pedal;

a pushrod interconnected between the brake pedal and the master cylinder wherein the master cylinder is actuated in response to the application of a force to the brake pedal;

a transducer monitoring application of the brake pedal;

an electrically actuated valve interposed in the brake line wherein the valve has three ports, a first port communicating with the hydraulic port of the master cylinder, a second port communicating with the hydraulic port of the wheel brake and a third port, wherein the first port is normally open to the second port through the valve;

a pedal feel emulating device communicating with the third port of the valve; and an electronic controller monitoring the transducer and operating to effect movement of the valve to a position wherein the first port is in communication with the third port and the second port is closed, and operating to effect operation of the electric motor driven power screw actuator to apply the wheel brake, and wherein, when an electrical signal to the valve is absent, actuation of the wheel brake is effected through hydraulic pressurization in the master cylinder with pressure communicated to the hydraulic actuator of the wheel brake through the brake line and the valve.

2. A vehicle braking system comprising:

a wheel brake having a backing plate, a first brake shoe having an upper end and a lower end and movably mounted to the backing plate, a second brake shoe having an upper end and a lower end and movably mounted to the backing plate, an electric driven power screw actuator mounted to the backing plate near the upper ends of the first and second brake shoes, an apply lever pivotally engaging the actuator and engaging the second brake shoe near the lower end of the second brake shoe, and a hydraulic actuator engaging the lower ends of the first and second brake shoes;

a master cylinder with a hydraulic port;

a brake line extending between the hydraulic port of the master cylinder and the hydraulic actuator of the wheel brake;

a brake pedal;

a pushrod interconnected between the brake pedal and the master cylinder wherein the master cylinder is actuated in response to the application of a force to the brake pedal;

a transducer monitoring the amount of force applied to the brake pedal;

an electrically actuated valve interposed in the brake line wherein the valve has three ports, a first port communicating with the hydraulic port of the master cylinder, a second port communicating with the hydraulic port of the wheel brake and a third port, wherein the first port is normally open to the second port through the valve;

a pedal feel emulating device communicating with the third port of the valve; and an electronic controller monitoring the transducer and operating to effect movement of the valve to a position wherein the first port is in communication with the third port and the second port is closed, and operating to effect operation of the electric motor driven power screw actuator to apply the wheel brake, and wherein, when an electrical signal to the valve is absent, actuation of the wheel brake is effected through hydraulic pressurization in the master cylinder with pressure communicated to the hydraulic actuator of the wheel brake through the brake line and the valve.

3. A vehicle braking system according to claim 2 further comprising a strut extending between the apply lever and the first brake shoe wherein when the power screw actuator is driven to actuate the wheel brake the apply lever forces the second brake shoe outwardly and the apply lever forces the link to push the first brake shoe outwardly.

4. A vehicle braking system according to claim 2 further comprising a second lever engaging the first brake shoe and a strut extending between the apply lever and the second lever wherein when the power screw actuator is driven to actuate the wheel brake the apply lever forces the second brake shoe outwardly and the apply lever applies force to the link transferring force to the first brake shoe to push the first brake shoe outwardly.

5. A vehicle braking system according to claim 3 further comprising an anchor pin secured to the backing plate at the upper ends of the first and second brake shoes wherein the hydraulic actuator includes a first plunger engaging the first brake shoe and a second plunger engaging the second brake shoe and when the hydraulic actuator is pressurized to actuate the wheel brake, the first shoe is rotated outwardly about the anchor pin by the first plunger and the second brake shoe is rotated outwardly about the anchor pin by the second plunger.

6. A vehicle braking system according to claim 4 further comprising an adjuster strut extending between the upper ends of the first and second brake shoes wherein the hydraulic actuator includes a body carrying a first piston in a bore with a positive stop on the first piston limiting travel of the first piston into the bore and wherein the body carries a second piston in the bore with a positive stop on the second piston limiting travel of the second piston into the bore.

7. A vehicle braking system according to claim 6 wherein the first piston of the hydraulic actuator engages the first brake shoe and wherein the second piston of the hydraulic actuator engages the second brake shoe and wherein when the hydraulic actuator is pressurized to actuate the wheel brake, the first piston applies force to the lower end of the first brake shoe and the second piston applies force to the lower end of the second brake shoe and wherein force is transferred from the upper end of the first brake shoe to the upper end of the second brake shoe through the adjuster strut.

8. A vehicle braking system comprising:

a wheel brake having a backing plate, a first brake shoe with an upper end and a lower end and movably mounted to the backing plate, a second brake shoe with an upper end and a lower end and movably mounted to the backing plate, an electric driven power screw actuator mounted to the backing plate near the upper ends of the first and second brake shoes, an apply lever pivotally engaging the actuator and engaging the second brake shoe near the lower end of the second brake shoe, and a hydraulic actuator fixed to the backing plate, wherein the hydraulic actuator includes a body carrying a first plunger engaging the lower end of the first brake shoe and carrying a second plunger engaging the lower end of the second brake shoe and wherein a post extends from the body of the hydraulic actuator and wherein at least one shoe return spring engages the post;

a master cylinder with a hydraulic port;

a brake line extending between the hydraulic port of the master cylinder and the hydraulic actuator of the wheel brake;

a brake pedal;

a pushrod interconnected between the brake pedal and the master cylinder wherein the master cylinder is actuated in response to the application of a force to the brake pedal;

a transducer monitoring the amount of force applied to the brake pedal;

an electrically actuated valve interposed in the brake line wherein the valve has three ports, a first port communicating with the hydraulic port of the master cylinder, a second port communicating with the hydraulic port of the wheel brake and a third port, wherein the first port is normally open to the second port through the valve;

a pedal feel emulating device communicating with the third port of the valve; and an electronic controller monitoring the transducer and operating to effect movement of the valve to a position wherein the first port is in communication with the third port and the second port is closed, and operating to effect operation of the electric motor driven power screw actuator to apply the wheel brake, and wherein, when an electrical signal to the valve is absent, actuation of the wheel brake is effected through hydraulic pressurization in the master cylinder with pressure communicated to the hydraulic actuator of the wheel brake through the brake line and the valve.

9. A vehicle braking system according to claim 8 wherein the shoe return spring comprises a unitary spring that engages both the first and second brake shoes and the post.

10. A vehicle braking system according to claim 8 wherein there is a first shoe return spring engaging the post and the first brake shoe and a second shoe return spring engaging the post and the second brake shoe.

* * * * *